US012014677B1

(12) United States Patent
Hussell

(10) Patent No.: US 12,014,677 B1
(45) Date of Patent: Jun. 18, 2024

(54) LIGHT-EMITTING DIODE PACKAGES WITH TRANSFORMATION AND SHIFTING OF PULSE WIDTH MODULATION SIGNALS AND RELATED METHODS

(71) Applicant: CreeLED, Inc., Durham, NC (US)

(72) Inventor: Christopher P. Hussell, Raleigh, NC (US)

(73) Assignee: CreeLED, Inc., Durham, NC (US)

( * ) Notice: Subject to any disclaimer, the term of this patent is extended or adjusted under 35 U.S.C. 154(b) by 0 days.

(21) Appl. No.: 18/298,049

(22) Filed: Apr. 10, 2023

(51) Int. Cl.
*G09G 3/3266* (2016.01)
*G09G 3/20* (2006.01)
*G09G 3/32* (2016.01)

(52) U.S. Cl.
CPC ............ *G09G 3/32* (2013.01); *G09G 3/2096* (2013.01); *G09G 2320/0233* (2013.01); *G09G 2320/041* (2013.01); *G09G 2320/064* (2013.01); *G09G 2320/0673* (2013.01); *G09G 2360/16* (2013.01); *G09G 2370/00* (2013.01)

(58) Field of Classification Search
None
See application file for complete search history.

(56) References Cited

U.S. PATENT DOCUMENTS 5,359,345 A 10/1994 Hunter
6,016,038 A 1/2000 Mueller et al.
6,150,774 A 11/2000 Mueller et al.
6,166,496 A 12/2000 Lys et al.
6,211,626 B1 4/2001 Lys et al.
6,292,901 B1 9/2001 Lys et al.
6,538,626 B1 3/2003 Nieberger et al.
(Continued)

FOREIGN PATENT DOCUMENTS

CN 1965340 A 5/2007
CN 101926222 A 12/2010
(Continued)

OTHER PUBLICATIONS

Author Unknown, "APA102-2020 Super LED," Datasheet, Shenzhen LED Color Opto Electronic Co., Ltd., retrieved Apr. 10, 2019 from http://www.led-color.com/upload/201604/APA102-2020%20SMD%20LED.pdf, 6 pages.
(Continued)

*Primary Examiner* — Carl Adams
(74) *Attorney, Agent, or Firm* — Withrow & Terranova, P.L.L.C.

(57) ABSTRACT

Light-emitting diode (LED) packages and, more particularly, LED packages with transformation and shifting of pulse width modulation (PWM) signals and related methods are disclosed. Discrete LED packages are arranged for cascade communication. Each LED package includes one or more LED chips, and each LED package is separately capable of receiving communication from a data stream, controlling operation of the one or more LED chips, and performing transformation and shifting of received PWM signals. Transformation may include compression and/or decompression of received PWM signals by each LED package to provide increased accessible dynamic range. After transformation, LED packages are capable of shifting transformed values to compensate for turn-on delay of LED chips, thereby reducing light drop-off problems at low intensity levels.

21 Claims, 6 Drawing Sheets

(56) References Cited

U.S. PATENT DOCUMENTS

| | | | |
|---|---|---|---|
| 7,206,001 B1 | 4/2007 | Crandall et al. | |
| 7,579,629 B2 | 8/2009 | Inoguchi | |
| 8,111,001 B2 | 2/2012 | Underwood et al. | |
| 8,328,405 B2 | 12/2012 | Negley | |
| 8,922,458 B2 | 12/2014 | Sefton et al. | |
| 8,937,492 B1 | 1/2015 | Gideon | |
| 8,970,131 B2 | 3/2015 | Brandes et al. | |
| 9,414,454 B2 | 8/2016 | Brandes et al. | |
| 9,717,123 B1 | 7/2017 | Yao | |
| 10,368,411 B2 | 7/2019 | Zhang et al. | |
| 10,384,239 B2 | 8/2019 | Fedigan et al. | |
| 10,453,827 B1 | 10/2019 | Hussell et al. | |
| 10,663,418 B2 | 5/2020 | Magee et al. | |
| 10,682,675 B2 | 6/2020 | Magee et al. | |
| 10,695,805 B2 | 6/2020 | Magee et al. | |
| 10,908,414 B2 | 2/2021 | Revier et al. | |
| 2001/0028356 A1 | 10/2001 | Balogh | |
| 2002/0130627 A1 | 9/2002 | Morgan et al. | |
| 2003/0058885 A1 | 3/2003 | Sorenson et al. | |
| 2004/0160199 A1 | 8/2004 | Morgan et al. | |
| 2004/0246278 A1 | 12/2004 | Elliott | |
| 2006/0022214 A1 | 2/2006 | Morgan et al. | |
| 2006/0114269 A1 | 6/2006 | Chang-Ho et al. | |
| 2006/0168496 A1 | 7/2006 | Steele et al. | |
| 2007/0097055 A1 | 5/2007 | Takamura et al. | |
| 2007/0195025 A1 | 8/2007 | Korcharz et al. | |
| 2007/0231846 A1 | 10/2007 | Cosentino et al. | |
| 2007/0237165 A1 | 10/2007 | Chiang | |
| 2007/0296464 A1 | 12/2007 | Lewko | |
| 2008/0018261 A1 | 1/2008 | Kastner | |
| 2008/0062158 A1 | 3/2008 | Willis | |
| 2008/0136844 A1* | 6/2008 | Takada | G09G 3/3413 345/690 |
| 2008/0245949 A1 | 10/2008 | Morimoto et al. | |
| 2009/0066526 A1 | 3/2009 | Marshall et al. | |
| 2009/0079362 A1 | 3/2009 | Shteynberg et al. | |
| 2009/0109168 A1 | 4/2009 | Lee et al. | |
| 2009/0147028 A1 | 6/2009 | Sefton et al. | |
| 2009/0164713 A1 | 6/2009 | Tsai et al. | |
| 2009/0179843 A1 | 7/2009 | Ackerman et al. | |
| 2009/0201274 A1 | 8/2009 | Kuwabara et al. | |
| 2009/0230885 A1 | 9/2009 | Tanaka | |
| 2009/0278034 A1 | 11/2009 | Ackermann et al. | |
| 2010/0026208 A1 | 2/2010 | Shteynberg et al. | |
| 2010/0085295 A1 | 4/2010 | Zhao et al. | |
| 2010/0102734 A1 | 4/2010 | Quick et al. | |
| 2010/0156952 A1 | 6/2010 | Arai | |
| 2010/0214764 A1 | 8/2010 | Chaves et al. | |
| 2011/0057302 A1 | 3/2011 | Spehar et al. | |
| 2012/0056864 A1 | 3/2012 | Aioanei | |
| 2012/0126711 A1 | 5/2012 | Suminoe et al. | |
| 2012/0147567 A1 | 6/2012 | Lee et al. | |
| 2012/0218754 A1 | 8/2012 | Maes | |
| 2012/0286674 A1 | 11/2012 | Takanashi | |
| 2012/0299480 A1 | 11/2012 | Peting et al. | |
| 2012/0306942 A1* | 12/2012 | Fujiwara | H05B 45/10 345/690 |
| 2013/0057763 A1 | 3/2013 | Cha et al. | |
| 2013/0076250 A1 | 3/2013 | Logiudice | |
| 2013/0228672 A1 | 9/2013 | Jung et al. | |
| 2014/0028776 A1 | 1/2014 | Kawamura | |
| 2014/0128941 A1 | 5/2014 | Williams | |
| 2014/0152902 A1 | 6/2014 | Morrisseau | |
| 2014/0265919 A1 | 9/2014 | Pope et al. | |
| 2014/0306966 A1 | 10/2014 | Kuo et al. | |
| 2015/0276144 A1 | 10/2015 | Tudhope et al. | |
| 2015/0319814 A1 | 11/2015 | Grotsch et al. | |
| 2015/0348496 A1 | 12/2015 | Santos, II et al. | |
| 2015/0377695 A1 | 12/2015 | Chang et al. | |
| 2016/0071467 A1 | 3/2016 | Elder et al. | |
| 2016/0161326 A1 | 6/2016 | Chang et al. | |
| 2016/0189605 A1 | 6/2016 | Ahn et al. | |
| 2016/0217762 A1 | 7/2016 | Moon et al. | |
| 2016/0293811 A1 | 10/2016 | Hussell et al. | |
| 2016/0314730 A1 | 10/2016 | Sampsell | |
| 2017/0092198 A1 | 3/2017 | Ryu et al. | |
| 2017/0168212 A1 | 6/2017 | Chen et al. | |
| 2017/0263828 A1 | 9/2017 | Mao et al. | |
| 2017/0294495 A1 | 10/2017 | Shyu et al. | |
| 2017/0330509 A1 | 11/2017 | Cok et al. | |
| 2017/0330856 A1 | 11/2017 | Zou et al. | |
| 2018/0033768 A1 | 2/2018 | Kumar et al. | |
| 2018/0035018 A1 | 2/2018 | Yamada et al. | |
| 2018/0076368 A1 | 3/2018 | Hussell | |
| 2018/0114800 A1 | 4/2018 | Pan | |
| 2018/0130441 A1 | 5/2018 | Jeon | |
| 2018/0182927 A1 | 6/2018 | Vampola et al. | |
| 2018/0247608 A1 | 8/2018 | Chen | |
| 2018/0261149 A1 | 9/2018 | Lin | |
| 2018/0348959 A1 | 12/2018 | Lin et al. | |
| 2019/0132921 A1 | 5/2019 | Rumer | |
| 2019/0132923 A1 | 5/2019 | Rumer | |
| 2019/0149792 A1 | 5/2019 | Luo et al. | |
| 2019/0302917 A1 | 10/2019 | Pan | |
| 2019/0335081 A1 | 10/2019 | Baar et al. | |
| 2019/0371974 A1 | 12/2019 | Hussell | |
| 2020/0105179 A1 | 4/2020 | Greenebaum et al. | |
| 2020/0105221 A1 | 4/2020 | Marcu et al. | |
| 2020/0135093 A1 | 4/2020 | Prathaban et al. | |
| 2020/0184900 A1 | 6/2020 | Shin et al. | |
| 2020/0203319 A1 | 6/2020 | Lee et al. | |
| 2020/0251050 A1 | 8/2020 | Yee | |
| 2020/0309357 A1 | 10/2020 | Hussell et al. | |
| 2020/0312220 A1 | 10/2020 | Hussell et al. | |
| 2020/0312222 A1 | 10/2020 | Hussell | |
| 2020/0312225 A1 | 10/2020 | Hussell | |
| 2020/0312226 A1 | 10/2020 | Hussell | |
| 2020/0312231 A1 | 10/2020 | Hussell | |
| 2020/0335042 A1* | 10/2020 | Son | G09G 3/3291 |
| 2021/0005761 A1 | 1/2021 | Tsai et al. | |
| 2021/0399183 A1 | 12/2021 | Hussell et al. | |
| 2022/0044643 A1 | 2/2022 | Gu et al. | |
| 2022/0198989 A1 | 6/2022 | Park et al. | |
| 2023/0252934 A1 | 8/2023 | Hussell | |

FOREIGN PATENT DOCUMENTS

| | | | |
|---|---|---|---|
| CN | 102483897 | A | 5/2012 |
| CN | 207852672 | U | 9/2018 |
| CN | 110782828 | A | 2/2020 |
| EP | 1306827 | B1 | 5/2003 |
| EP | 2400682 | A1 | 12/2011 |
| JP | 2002229502 | A | 8/2002 |
| JP | 2010091825 | A | 4/2010 |
| JP | 201773411 | A | 4/2017 |
| WO | 2005048231 | A1 | 5/2005 |
| WO | 2020030993 | A1 | 2/2020 |
| WO | 2021183299 | A1 | 9/2021 |

OTHER PUBLICATIONS

Author Unknown, "APA102C: Rgb Full Color LED control IC," iPixel LED, Shiji Lighting, retrieved Apr. 10, 2019 from https://cdn-shop.adafruit.com/datasheets/APA102.pdf, 5 pages.

Author Unknown, "Self-clocking signal," Jul. 1, 2018, Wikipedia, https://en.wikipedia.org/w/index.php?title=Self-clocking_signal&oldid=848405107, 3 pages.

Author Unknown, "Serial communication," May 2, 2019, Wikipedia, https://en.wikipedia.org/w/index.php?title=Serial_communication&oldid=895110130, 4 pages.

Author Unknown, "SK6812 Technical Data Sheet," Shenzhen LED Color Optoelectronic Co., Ltd., retrieved Apr. 10, 2019 from https://cdn-shop.adafruit.com/product-files/1138/SK6812+LED+datasheet+.pdf, 8 pages.

Author Unknown, "SK6812RGBW Specification: Integrated Light Source Intelligent Control of Chip-On-Top SMD Type LED," Jul. 31, 2015, Dongguang Opsco Optpelectronics Co., Ltd., 16 pages.

Author Unknown, "WS2811: Signal line 256 Gray level 3 channal Constant current LED drive IC," Worldsemi, retrieved May 23, 2019 from https://cdn-shop.adafruit.com/datasheets/WS2811.pdf, 7 pages.

(56) References Cited

OTHER PUBLICATIONS

Author Unknown, "WS2812: Intelligent control LED integrated light source," Worldsemi, retrieved Apr. 10, 2019 from https://cdn-shop.adafruit.com/datasheets/WS2811.pdf, 5 pages.
Zhu, K., "EC20-6812 Specification: Embedded Control LED," Dec. 19, 2018, Shenzhen Normand Electronic Co., Ltd., 35 pages.
Invitation to Pay Additional Fees and Partial Search for International Patent Application No. PCT/US2020/023140, dated Jun. 16, 2020, 25 pages.
International Search Report and Written Opinion for International Patent Application No. PCT/US2020/023140, dated Aug. 11, 2020, 27 pages.
Non-Final Office Action for U.S. Appl. No. 16/369,003, dated Aug. 21, 2020, 15 pages.
Non-Final Office Action for U.S. Appl. No. 16/381,116, dated Aug. 21, 2020, 8 pages.
Non-Final Office Action for U.S. Appl. No. 16/437,878, dated Aug. 21, 2020, 14 pages.
Non-Final Office Action for U.S. Appl. No. 16/542,923, dated Aug. 21, 2020, 15 pages.
Reason for Rejection for Japanese Patent Application No. 2021-560354, dated Oct. 11, 2022, 7 pages.
Invitation to Pay Additional Fees and Partial Search for International Patent Application No. PCT/US2021/019708, dated May 25, 2021, 17 pages.
International Search Report and Written Opinion for International Patent Application No. PCT/US2021/019708, dated Jul. 19, 2021, 23 pages.
Final Office Action for U.S. Appl. No. 16/369,003, dated Dec. 9, 2020, 17 pages.
Advisory Action for U.S. Appl. No. 16/369,003, dated Feb. 11, 2021, 3 pages.
Non-Final Office Action for U.S. Appl. No. 16/369,003, dated Apr. 1, 2021, 18 pages.
Final Office Action for U.S. Appl. No. 16/369,003, dated Jul. 22, 2021, 16 pages.
Advisory Action for U.S. Appl. No. 16/369,003, dated Sep. 23, 2021, 3 pages.
Non-Final Office Action for U.S. Appl. No. 16/369,003, dated Nov. 12, 2021, 19 pages.
Final Office Action for U.S. Appl. No. 16/369,003, dated Mar. 31, 2022, 23 pages.
Non-Final Office Action for U.S. Appl. No. 16/369,003, dated Jul. 21, 2022, 29 pages.
Final Office Action for U.S. Appl. No. 16/369,003, dated Nov. 1, 2022, 23 pages.
Final Office Action for U.S. Appl. No. 16/369,003, dated Nov. 3, 2022, 24 pages.
Final Office Action for U.S. Appl. No. 16/369,003, dated Dec. 12, 2022, 24 pages.
Final Office Action for U.S. Appl. No. 16/381,116, dated Dec. 10, 2020, 10 pages.
Advisory Action for U.S. Appl. No. 16/381,116, dated Feb. 11, 2021, 3 pages.
Non-Final Office Action for U.S. Appl. No. 16/381,116, dated Apr. 1, 2021, 12 pages.
Final Office Action for U.S. Appl. No. 16/381,116, dated Jul. 22, 2021, 9 pages.
Non-Final Office Action for U.S. Appl. No. 16/381,116, dated Nov. 12, 2021, 10 pages.
Final Office Action for U.S. Appl. No. 16/381,116, dated Mar. 2, 2022, 17 pages.
Advisory Action and Examiner-Initiated Interview Summary for U.S. Appl. No. 16/381,116, dated May 6, 2022, 4 pages.
Non-Final Office Action for U.S. Appl. No. 16/381,116, dated Jun. 22, 2022, 17 pages.
Final Office Action for U.S. Appl. No. 16/381,116, dated Oct. 4, 2022, 17 pages.
Final Office Action for U.S. Appl. No. 16/437,878, dated Dec. 9, 2020, 14 pages.
Advisory Action and Examiner-Initiated Interview Summary for U.S. Appl. No. 16/437,878, dated Feb. 11, 2021, 4 pages.
Non-Final Office Action for U.S. Appl. No. 16/437,878, dated Apr. 1, 2021, 16 pages.
Non-Final Office Action for U.S. Appl. No. 16/437,878, dated Apr. 23, 2021, 17 pages.
Final Office Action for U.S. Appl. No. 16/437,878, dated Sep. 1, 2021, 16 pages.
Non-Final Office Action for U.S. Appl. No. 16/437,878, dated Dec. 15, 2021, 17 pages.
Final Office Action for U.S. Appl. No. 16/437,878, dated Mar. 31, 2022, 22 pages.
Final Office Action for U.S. Appl. No. 16/437,878, dated Jul. 21, 2022, 23 pages.
Non-Final Office Action for U.S. Appl. No. 16/437,878, dated Oct. 27, 2022, 21 pages.
Final Office Action for U.S. Appl. No. 16/542,923, dated Dec. 10, 2020, 16 pages.
Advisory Action and Examiner-Initiated Interview Summary for U.S. Appl. No. 16/542,923, dated Feb. 11, 2021, 4 pages.
Non-Final Office Action for U.S. Appl. No. 16/542,923, dated Apr. 1, 2021, 19 pages.
Examination Report for European Patent Application No. 20718953.1, dated Jul. 6, 2023, 11 pages.
Final Office Action for U.S. Appl. No. 16/437,878, dated Sep. 19, 2023, 20 pages.
Non-Final Office Action for U.S. Appl. No. 17/081,522, dated Sep. 13, 2023, 13 pages.
Non-Final Office Action for U.S. Appl. No. 18/065,397, dated Aug. 28, 2023, 9 pages.
Notice of Reason for Rejection for Japanese Patent Application No. 2022-554701, dated Sep. 19, 2023, 11 pages.
Advisory Action for U.S. Appl. No. 16/437,878, dated Nov. 28, 2023, 3 pages.
Non-Final Office Action for U.S. Appl. No. 18/320,498, dated Dec. 6, 2023, 12 pages.
Final Office Action for U.S. Appl. No. 16/542,923, dated Jul. 22, 2021, 19 pages.
Advisory Action for U.S. Appl. No. 16/542,923, dated Sep. 23, 2021, 3 pages.
Non-Final Office Action for U.S. Appl. No. 16/542,923, dated Nov. 12, 2021, 21 pages.
Final Office Action for U.S. Appl. No. 16/542,923, dated Mar. 2, 2022, 21 pages.
Advisory Action and Examiner-Initiated Interview Summary for U.S. Appl. No. 16/542,923, dated May 6, 2022, 4 pages.
Non-Final Office Action for U.S. Appl. No. 16/542,923, dated Jun. 22, 2022, 23 pages.
Final Office Action for U.S. Appl. No. 16/542,923, dated Oct. 7, 2022, 23 pages.
Final Office Action for U.S. Appl. No. 16/542,923, dated Nov. 14, 2022, 29 pages.
Advisory Action and Examiner-Initiated Interview Summary for U.S. Appl. No. 16/542,923, dated Dec. 15, 2022, 4 pages.
Non-Final Office Action for U.S. Appl. No. 16/543,009, dated Apr. 1, 2021, 14 pages.
Final Office Action for U.S. Appl. No. 16/543,009, dated Jul. 23, 2021, 15 pages.
Advisory Action for U.S. Appl. No. 16/543,009, dated Sep. 23, 2021, 3 pages.
Final Office Action for U.S. Appl. No. 16/543,009, dated Nov. 12, 2021, 15 pages.
Non-Final Office Action for U.S. Appl. No. 16/543,009, dated Mar. 4, 2022, 15 pages.
Final Office Action for U.S. Appl. No. 16/543,009, dated Jun. 10, 2022, 16 pages.
Non-Final Office Action for U.S. Appl. No. 16/543,009, dated Oct. 7, 2022, 16 pages.
Final Office Action for U.S. Appl. No. 16/543,009, dated Jan. 19, 2023, 19 pages.
Non-Final Office Action for U.S. Appl. No. 16/815,101, dated Nov. 12, 2021, 13 pages.

(56) References Cited

OTHER PUBLICATIONS

Final Office Action for U.S. Appl. No. 16/815,101, dated Mar. 2, 2022, 14 pages.
Advisory Action and Examiner-Initiated Interview Summary for U.S. Appl. No. 16/815,101, dated May 6, 2022, 4 pages.
Non-Final Office Action for U.S. Appl. No. 16/815,101, dated Jun. 22, 2022, 17 pages.
Final Office Action for U.S. Appl. No. 16/815,101, dated Oct. 7, 2022, 16 pages.
Advisory Action and Examiner-Initiated Interview Summary for U.S. Appl. No. 16/815,101, dated Dec. 20, 2022, 4 pages.
Ex Parte Quayle Action for U.S. Appl. No. 16/815,101, dated Jan. 19, 2023, 7 pages.
Non-Final Office Action for U.S. Appl. No. 17/081,522, dated Jan. 20, 2022, 18 pages.
Final Office Action for U.S. Appl. No. 17/081,522, dated Apr. 28, 2022, 10 pages.
Advisory Action for U.S. Appl. No. 17/081,522, dated Jul. 5, 2022, 3 pages.
Non-Final Office Action for U.S. Appl. No. 17/081,522, dated Aug. 17, 2022, 9 pages.
Final Office Action for U.S. Appl. No. 17/081,522, dated Nov. 10, 2022, 10 pages.
Advisory Action and Examiner-Initiated Interview Summary for U.S. Appl. No. 17/081,522, dated Jan. 23, 2023, 4 pages.
Non-Final Office Action for U.S. Appl. No. 16/906,129, dated Jun. 9, 2022, 14 pages.
Final Office Action for U.S. Appl. No. 16/906,129, dated Dec. 12, 2022, 15 pages.
Notice of Allowance and Examiner-Initiated Interview Summary for U.S. Appl. No. 16/542,923, dated Mar. 17, 2023, 11 pages.
Notice of Allowance for U.S. Appl. No. 16/815,101, dated Feb. 13, 2023, 10 pages.
Non-Final Office Action for U.S. Appl. No. 17/081,522, dated Mar. 2, 2023, 11 pages.
Notice of Allowance for U.S. Appl. No. 16/906,129, dated Feb. 27, 2023, 10 pages.
Notice of Reason for Rejection for Japanese Patent Application No. 2021-560354, dated Mar. 10, 2023, 4 pages.
International Search Report and Written Opinion for International Patent Application No. PCT/US2023/061653, dated Apr. 6, 2023, 24 pages.
Notice of Allowance for U.S. Appl. No. 16/369,003, dated Mar. 30, 2023, 9 pages.
Advisory Action and Examiner-Initiated Interview Summary for U.S. Appl. No. 16/437,878, dated Apr. 14. 2023, 4 pages.
Non-Final Office Action for U.S. Appl. No. 16/437,878, dated May 31, 2023, 19 pages.
Advisory Action and Examiner-Initiated Interview Summary for U.S. Appl. No. 16/543,009, dated Mar. 28, 2023, 4 pages.
Notice of Allowance for U.S. Appl. No. 16/543,009, dated May 24, 2023, 10 pages.
Final Office Action for U.S. Appl. No. 17/081,522, dated Jun. 7, 2023, 11 pages.
Non-Final Office Action for U.S. Appl. No. 16/437,878, dated Jan. 3, 2024, 20 pages.
Final Office Action for U.S. Appl. No. 17/081,522, dated Dec. 13, 2023, 15 pages.
First Office Action for Chinese Patent Application No. 2020800255413, dated Oct. 25, 2023, 19 pages.
Author Unknown, "ARRI LogC4: Logarithmic Color Space," Specification, first published Jul. 7, 2021, ARRI AG, 20 pages.
Decision to Grant for Japanese Patent Application No. 2022-554701, mailed Feb. 20, 2024, 6 pages.
International Search Report and Written Opinion for International Patent Application No. PCT/US2023/079460, mailed Feb. 23, 2024, 16 pages.
Final Office Action for U.S. Appl. No. 16/437,878, mailed Apr. 5, 2024, 21 pages.
Final Office Action for U.S. Appl. No. 18/320,498, mailed Feb. 27, 2024, 14 pages.
Notice of Allowance for U.S. Appl. No. 17/081,522, mailed Apr. 5, 2024, 8 pages.
Advisory Action and Examiner-Initiated Interview Summary for U.S. Appl. No. 17/081,522, mailed Feb. 16, 2024, 5 pages.
Notification to Grant for Chinese Patent Application No. 202080025541.3, mailed Mar. 20, 2024, 6 pages.
Notice of Preliminary Rejection for Korean Patent Application No. 10-2022-7034893, mailed Mar. 7, 2024, 17 pages.
Invitation to Pay Additional Fees and Partial Search for International Patent Application No. PCT/US2024/013657, mailed Apr. 15, 2024, 11 pages.

* cited by examiner

LIGHT-EMITTING DIODE PACKAGES WITH TRANSFORMATION AND SHIFTING OF PULSE WIDTH MODULATION SIGNALS AND RELATED METHODS

FIELD OF THE DISCLOSURE

The present disclosure relates to light-emitting diode (LED) packages and, more particularly, to LED packages with transformation and shifting of pulse width modulation signals and related methods.

BACKGROUND

Light-emitting diodes (LEDs) are solid-state devices that convert electrical energy to light and generally include one or more active layers of semiconductor material (or an active region) arranged between oppositely doped n-type and p-type layers. When a bias is applied across the doped layers, holes and electrons are injected into the one or more active layers where they recombine to generate emissions such as visible light or ultraviolet emissions.

LEDs have been widely adopted in various illumination contexts, for backlighting of liquid crystal display (LCD) systems (e.g., as a substitute for cold cathode fluorescent lamps) and for direct-view LED displays. Applications utilizing LED arrays include vehicular headlamps, roadway illumination, light fixtures, and various indoor, outdoor, and specialty contexts. Desirable characteristics of LED devices include high luminous efficacy and long lifetime.

Large format multi-color direct-view LED displays (including full color LED video screens) typically include numerous individual LED panels, packages, and/or components providing image resolution determined by the distance between adjacent pixels or "pixel pitch." Direct-view LED displays typically include three-color displays with arrayed red, green, and blue (RGB) LEDs, and two-color displays with arrayed red and green (RG) LEDs. Other colors and combinations of colors may be used. For many LED display systems, it is desirable to form LED color groups for each pixel such as primary colors red, green, and blue (RGB) that define vertices of a triangle (or polygon) on a chromaticity diagram. This polygon defines the so-called color gamut of the display device, the area of which describes all the possible colors that the display device is capable of producing. Driver printed circuit boards for controlling LED displays are typically densely populated with electrical devices including capacitors, field effect transistors (FETs), decoders, microcontrollers, and the like for driving the pixels of the display. As pixel pitches continue to decrease for higher resolution displays, the density of such electrical devices scales higher corresponding to the increased number of pixels for a given panel area. This tends to add higher complexity and costs to LED panels for display applications.

The art continues to seek improved LED array devices with small pixel pitches while overcoming limitations associated with conventional devices and production methods.

SUMMARY

The present disclosure relates to light-emitting diode (LED) packages and, more particularly, to LED packages with transformation and shifting of pulse width modulation (PWM) signals and related methods. Discrete LED packages are arranged for cascade communication. Each LED package includes one or more LED chips, and each LED package is separately capable of receiving communication from a data stream, controlling operation of the one or more LED chips, and performing transformation and shifting of received data, thereby producing modified PWM signals. Transformation may include compression and/or decompression of received data by each LED package to provide increased accessible dynamic range. After transformation, LED packages are capable of shifting transformed values to compensate for turn-on delay of the LED chips, thereby reducing light drop-off problems at low intensity levels.

In one aspect, a method of light output control within an LED package comprises: transforming a received input brightness value to provide a transformation result; applying a shift value to the transformation result to provide a pulse width modulation (PWM) value; and producing a PWM signal with a pulse width according to the PWM value. The method may further comprise electrically activating an LED chip within the LED package with the PWM signal, wherein the shift value is configured such that the pulse width of the PWM signal is greater than a turn-on time for the LED chip for all possible PWM values. In certain embodiments, transforming the received input brightness value comprises thermal compensation. In certain embodiments, transforming the received input brightness value comprises data decompression. In certain embodiments, the data decompression models a gamma function. In certain embodiments, transforming the received input brightness value comprises multiplication by a calibration factor. In certain embodiments, producing the PWM signal with the pulse width according to the PWM value comprise a comparison with a PWM counter value, wherein the PWM counter value is updated at a rate according to a clock frequency. In certain embodiments, the clock frequency is determined by a local clock of the LED package. In certain embodiments, the clock frequency is determined by a communication speed of a digital signal received by the LED package. In certain embodiments, the clock frequency is determined by an external clock. In certain embodiments, applying the shift value to the transformation result comprises only applying the shift value when the transformation result is above zero. In certain embodiments, the shift value is applied in a manner so that the PWM value saturates and does not exceed a maximum value of a PWM period and does not roll over to low values.

In another aspect, an LED package configured for receiving and transmitting digital communication signals comprises: at least one LED chip; an LED driver configured to at least partially drive the at least one LED chip by pulse width modulation (PWM); and a PWM processor configured to provide a transformation result based on at least one of multiplication or exponential transformation of a received input brightness value, the PWM processor further configured to provide a PWM value based on a shift of the transformation result. In certain embodiments, the PWM processor is configured to produce a PWM signal to the LED driver based on the PWM value. In certain embodiments, a portion of the PWM signal leaving the PWM processor is zero when the transformation result is zero. In certain embodiments, the PWM processor is configured to provide the PWM value as a final operation before conveyance of the PWM signal to the LED driver. In certain embodiments, the PWM processor comprises a transformation element configured to provide the transformation result and a shifter element configured to provide the PWM value. In certain embodiments, the PWM processor comprises a processing element that is configured to provide both the transformation result and the PWM value. In certain embodiments, the processing element is configured to perform multiple calculations at different times. In certain embodiments, the processing element is configured to perform the multiple calculations under the control of a finite state machine. In certain embodiments, the processing element forms at least a portion of an arithmetic logic unit (ALU). In certain embodiments, the PWM processor is configured such that the PWM value does not exceed a maximum value of a PWM period and the PWM value does not roll over to a lower value. In certain embodiments: the PWM processor is configured to provide a PWM signal to the LED driver with a pulse width according to the PWM value; and the pulse width of the PWM signal is greater than a turn-on time for the at least one LED chip for all levels of a PWM period of the PWM signal.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
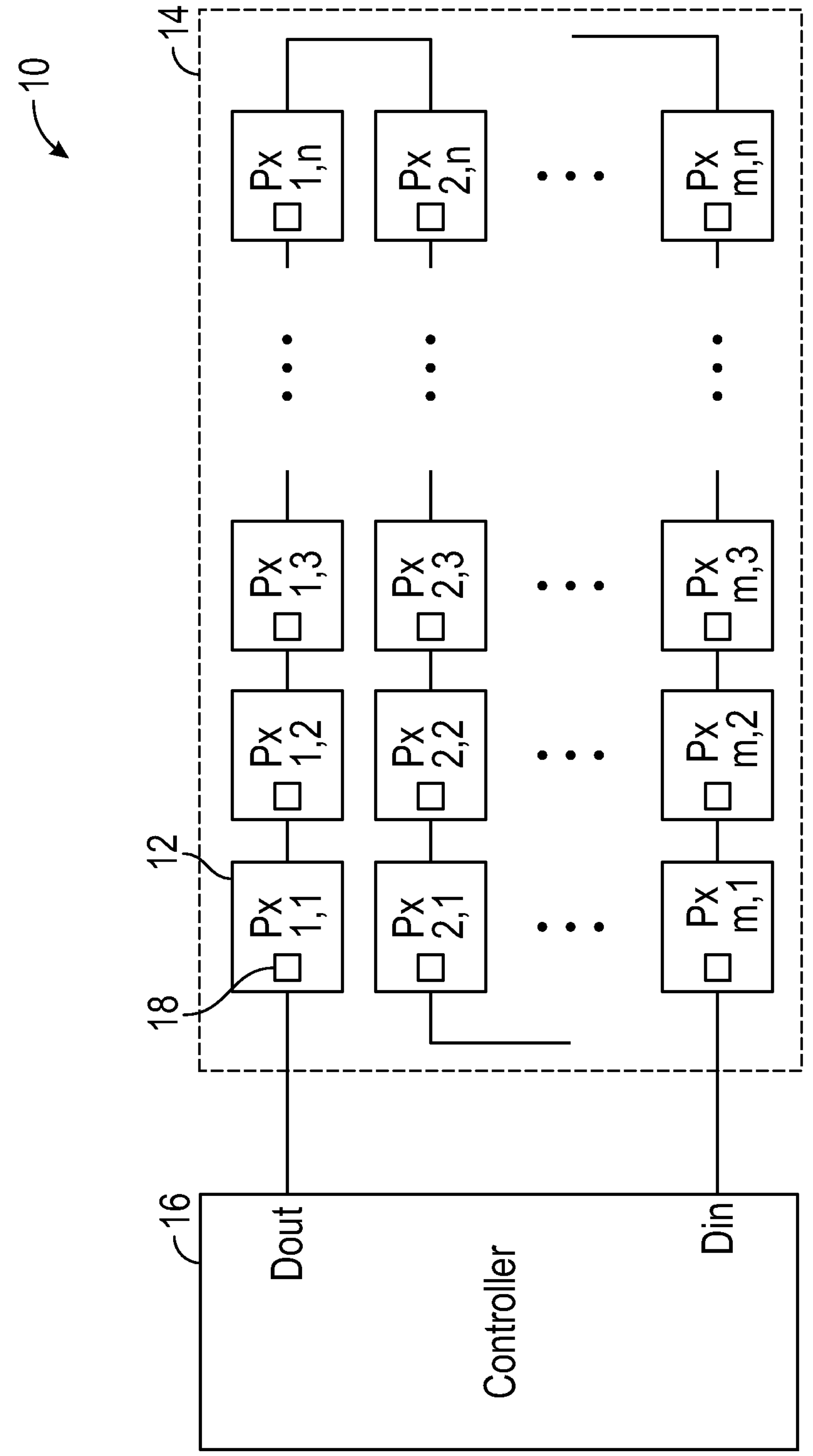
FIG. 1 is a block diagram illustrating a system level control scheme for a lighting device using cascade communication for serially connected light-emitting diode (LED) packages

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to light-emitting diode (LED) packages and, more particularly, to LED packages with transformation and shifting of data used to produce pulse width modulation (PWM) signals and related methods. Discrete LED packages are arranged for cascade communication. Each LED package includes one or more LED chips, and each LED package is separately capable of receiving communication from a data stream, controlling operation of the one or more LED chips, and performing transformation and shifting of received PWM signals. Transformation may include compression and/or decompression of received data by each LED package to provide increased accessible dynamic range. After transformation, LED packages are capable of shifting transformed values to compensate for turn-on delay of the LED chips, thereby reducing light drop-off problems at low intensity levels.

In cascade digital communication, multiple electronic devices are arranged as repeaters to successively receive serial communication for operation. In the context of fine-pitch video displays, multiple LED packages are serially arranged as LED pixels to receive cascade communication. Incoming signals to each LED pixel are produced by another element, such as a master controller or the previous LED pixel, and the bitstream of incoming signals is derived from clock domains of one or more preceding devices. Proper distribution of communication signals to thousands of LED pixels creates challenges. Small sizes are required for LED packages to form pixels of high-resolution video displays and these size constraints provide further challenges.

As used herein, the terms "data stream" and "communication channel" may at times be used interchangeably. However, a "data stream" generally refers to a non-physical representation of data over time that flows through a set of at least one communication channel as well as the internal wiring and storage registers within various elements such as controllers and active electrical elements. A data stream may also be referred to as digital communication between two elements, such as a controller element that transmits digital communication and a receiver element that receives the digital communication. A "communication channel" generally refers to a physical medium through which the data stream is conveyed. For example, a communication channel may comprise a wire with associated electrical elements, an optical fiber, or even air as in the case of radio, light, or sound waves. A given physical channel could also be divided up in time or frequencies to allow multiple "communication channels" within one medium at once such as changing to a different frequency band. In certain aspects, communication channels may embody serial digital communication channels. Certain aspects relate to a binary communication channel that is a single wire referenced to a common conductor such as ground, which commonly can only hold one value at a time which is high or low voltage (e.g., digital "0" or "1") and is controlled by the output register of the preceding device. Two-wire differential signaling methods are also contemplated, but the preferred embodiment shown here refers to the single-wire approach primarily because of the added complexity of providing more traces with fine pitch displays.

In certain aspects, the present disclosure relates to light-emitting devices including LEDs, LED packages, and related LED displays and, more particularly, to active control of LEDs within LED displays. LED displays may include rows and columns of LEDs that form an array of LED pixels. A particular LED pixel may include a cluster of LED chips of the same color or multiple colors, with an exemplary LED pixel including a red LED chip, a green LED chip, and a blue LED chip. In certain embodiments, an LED package includes a plurality of LED chips that form at least one LED pixel, and a plurality of such LED packages may be arranged to form an array of LED pixels for an LED display. Each LED package may include its own active electrical element that is configured to receive a control signal and actively maintain an operating state, such as brightness or grey level or a color select signal for the LED chips of the LED device while other LED devices are being addressed. In certain embodiments, the active electrical element may include active circuitry that includes one or more of a driver device, a signal conditioning or transformation device, a memory device, a decoder device, an electrostatic discharge (ESD) protection device, a thermal management device, and a detection device, among others. The active electrical element further includes circuitry to facilitate communication with multiple uncorrelated clock domains, including an original clock domain from a controller and a local clock domain derived within the active electrical element. In this regard, each LED pixel of an LED display may be configured for operation with active matrix addressing with mixed clock domain communication. The active electrical element may be configured to receive one or more of an analog control signal, an encoded analog control signal, a digital control signal, and an encoded digital control signal. In such arrangements, strings of LED packages, each with their own active electrical element, may be arranged for serial communication where each active electrical element receives data from a data stream and transmits data to the next active electrical element in the string of LED packages.

For active matrix addressing, each LED pixel is configured to actively maintain an operating state or otherwise control the driving state, such as brightness or grey level or color select, while other LED pixels are being addressed, thereby allowing each LED pixel to maintain or otherwise independently control their driving state and provide improved display and/or image recording with photographic equipment by reducing or eliminating effects caused by lower-frequency pulsing beating of the display light output with other non-synchronized equipment (e.g., lighting sources, other pulsed displays, or image capture equipment). Accordingly, each LED pixel may be configured to hold its respective operating state with a continuous drive signal, inclusive of pulse-width modulation (PWM), rather than by conventional methods using time division multiplexed signals scanning among groups of pixels that often result in the addition of low frequency components to the drive signals associated with passive matrix addressing. In this regard, each LED pixel may include an active electrical chip or an active electrical element that may include a memory device and the ability to alter a driving condition of the LED pixel based on a state stored in the memory of the active electrical element. In certain embodiments, the continuous drive signal is a constant analog drive current, and in other embodiments where the brightness level may be controlled by pulsed methods such as PWM, the continuous drive signal may refer to a PWM signal that is not interrupted by the time division multiplexed scanning of other LED pixels within the array or within a sub-array. In certain embodiments, the active electrical element may include active circuitry that includes one or more of a driver device, a signal conditioning or transformation device, a memory device, a decoder device, an ESD protection device, a thermal management device, a detection device, and a voltage and/or current sensing device, a command processing device, and circuitry, among others. In various embodiments, an active electrical element comprises an integrated circuit chip, an application-specific integrated circuit (ASIC), a microcontroller, or a field-programmable gate array (FPGA). In certain embodiments, active electrical elements may be configured to be programmable or reprogrammable after they are manufactured through various memory elements and logic that are incorporated within the active electrical elements.

As used herein, the terms "active electrical chip," "active electrical element," or "active electrical component" include any chip or component that is able to alter a driving condition of an LED based on memory or other information that may be stored within a chip or component. As used herein, the terms "active LED pixel" and "smart LED pixel" may be used interchangeably and may refer to a device that includes one or more LED devices or chips that form a pixel and an active electrical element or chip as described above. In certain embodiments, each LED pixel may comprise a single LED package that is configured as an active LED package that includes multiple LED chips and an active electrical element as described above. In this manner, the number of separate electrical devices needed for the LED display may be reduced, such as the separate electrical devices located on the backsides of LED panels of the LED display as previously described. Additionally, overall operating powers needed for operation of the LED panels may be reduced.

Performance of LED displays continues to advance. Previously, LED displays were more adept for static images such as LED signs rather than dynamic application such as video displays since many of the performance metrics expected for good video image display were lacking. Various performance metrics needed for consideration of LEDs for high-quality video display include resolution, contrast, viewing angle, dynamic range, brightness, frame rate, and color gamut, among others. Recent advancements in LED packages, improvements in LED driver quality, and cost reductions have greatly improved the resolution, among other requirements. As the resolution has increased, the packing density of LED packages, such as on printed circuit boards (PCBs) has also increased and become more complex. The driving of LEDs within LED packages to achieve high dynamic range simultaneously with high frame and refresh rates remains challenging. This is because current driving techniques require remote drivers placed on the opposing side of PCBs containing LED arrays. Packing density constraints dictate that the drivers need to be shared via time division multiplexing techniques, such as raster scan. As the preferred driving techniques for LEDs utilize PWM to set the brightness, ever-higher frequencies are required to achieve high dynamic range. Consequently, the dynamic range is limited by the highest frequency pulse that can be delivered through in view of with parasitic resistance, capacitance, and inductance. LED packages arranged as pixels for cascade serial communication afford the opportunity to provide drivers local to each LED package, thereby providing improved dynamic range by removing the need for shared drivers and greatly reducing the parasitic resistance, capacitance, and inductance.

FIG. 1 is a block diagram 10 illustrating a system level control scheme for a lighting device using cascade communication for serially connected LED packages 12. The lighting device may embody an LED display and each LED package 12 may form an LED pixel of the display. For such applications, the terms LED package and LED pixel may be used interchangeably, although it is recognized that an LED package may be composed of several LED pixels formed together in one component. An exemplary LED string 14 arranged for serial communication is indicated by a dashed box in FIG. 1. While only the single LED string 14 is provided in detail, one or more other LED strings may also be coupled with a controller 16. As illustrated, the controller 16 is arranged to control one or more LED strings 14. The controller 16 may comprise an integrated circuit, such as one or more of an ASIC, a microcontroller, a programmable control element, and an FPGA. In certain embodiments, the controller 16 may be referred to as a master controller for the LED string 14. In other embodiments, the controller 16 may be a sub-controller to which another master controller (not shown) delegates a set of tasks as it pertains to a larger system. A data signal out (DOUT) of the controller 16 may be passed along the LED string 14 in a serial manner, and a return data signal in (DIN) may be received back by the controller 16. The signal includes an original clock domain provided by the controller 16 or another master controller as described above. In FIG. 1, each LED package 12, or LED pixel, is provided with a label such as "Px 1,1" where the first number represents a row, and the second number represents a column. Each LED package 12 includes its own active electrical element 18 that is registered and housed therewithin so that each LED package 12 comprises logic for responding to received data signals.

According to the arrangement of FIG. 1, important aspects include delivery of high bit depth data to incorporated LED drivers within each LED package 12 and being capable of converting data effectively to energize the LED chips within each LED package 12 according to expected light output levels with increased dynamic range. In certain aspects, LED packages 12 and associated active electrical elements 18 are capable of transforming received data by way of compression and/or decompression techniques such as gamma function or correction. However, as this transformed data is used for input to a PWM driver, lower values may not produce the expected response from LED chips due to pulse width being shorter than time delay required to energize the LED chips. This can happen over several of the lowest brightness levels resulting in a dramatic reduction of the dynamic range. As disclosed herein, LED packages 12 and related methods are disclosed where integrated LED drivers are controlled such that the dynamic range from bit depths is better achieved as expected. As described later in greater detail, LED packages 12 are disclosed that are capable of transforming received data and provide increased dynamic range by shifting transformed values sufficiently to compensate for time delay required to energize the LED chips. By applying shift values to transformed data, pulse widths that are shorter than turn-on time delay for LED chips may be avoided. As such, with proper selection of shift values, all data values conveyed to the PWM driver produce light output from the respective LED chips.

Figure 2A:
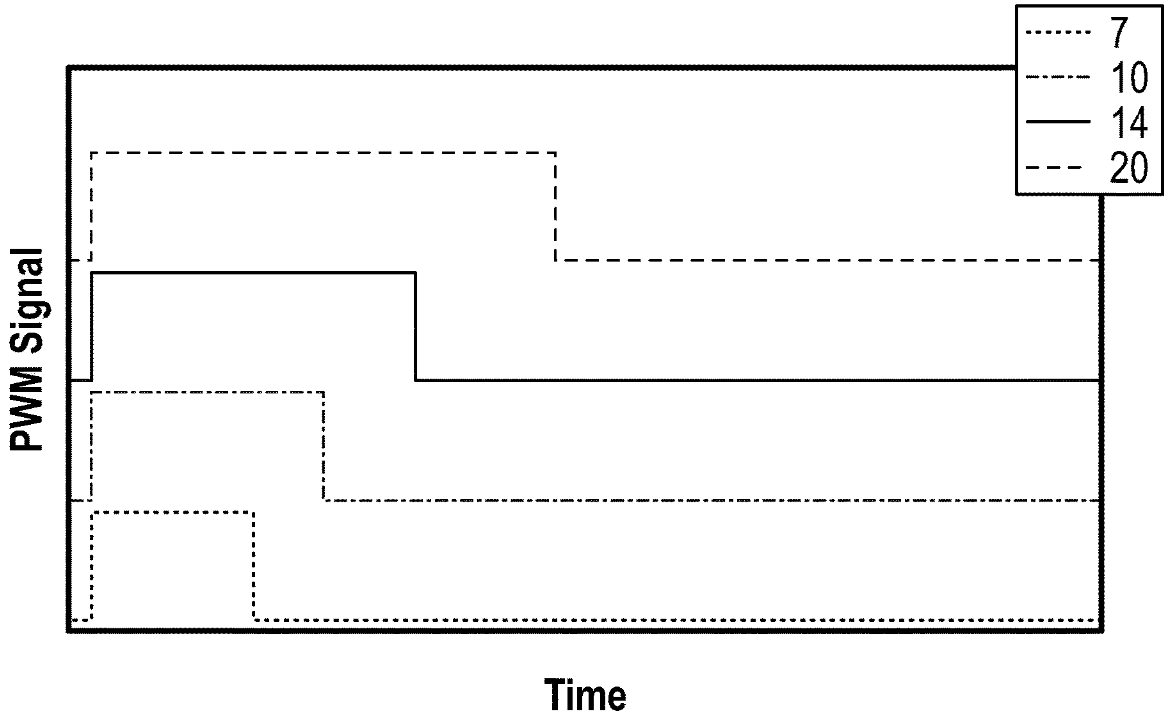
FIG. 2A is a plot representing several pulse widths corresponding to low-level brightness input values of a pulse width modulation (PWM) signal.

FIG. 2A is a plot representing several pulse widths corresponding to low-level brightness input values of a PWM signal. The y-axis represents a PWM signal that may be provided to the current or power drivers internal to the LED packages 12 of FIG. 1. In certain aspects, the PWM signal may be the output of a PWM processor as later described herein. The x-axis represents relative time to show a comparison of pulse widths. Pulse widths for brightness values or levels of 7, 10, 14, and 20 are illustrated that represent lower brightness values for any type of bit depth, such as 8-bit or 16-bit, among others. For example, the values of 7, 10, 14, and 20 could represent lower brightness levels out of 255 levels for 8-bit signals or out of 65,535 levels for 16-bit levels. As illustrated, the pulse width increases with increasing brightness level.

Figure 2B:
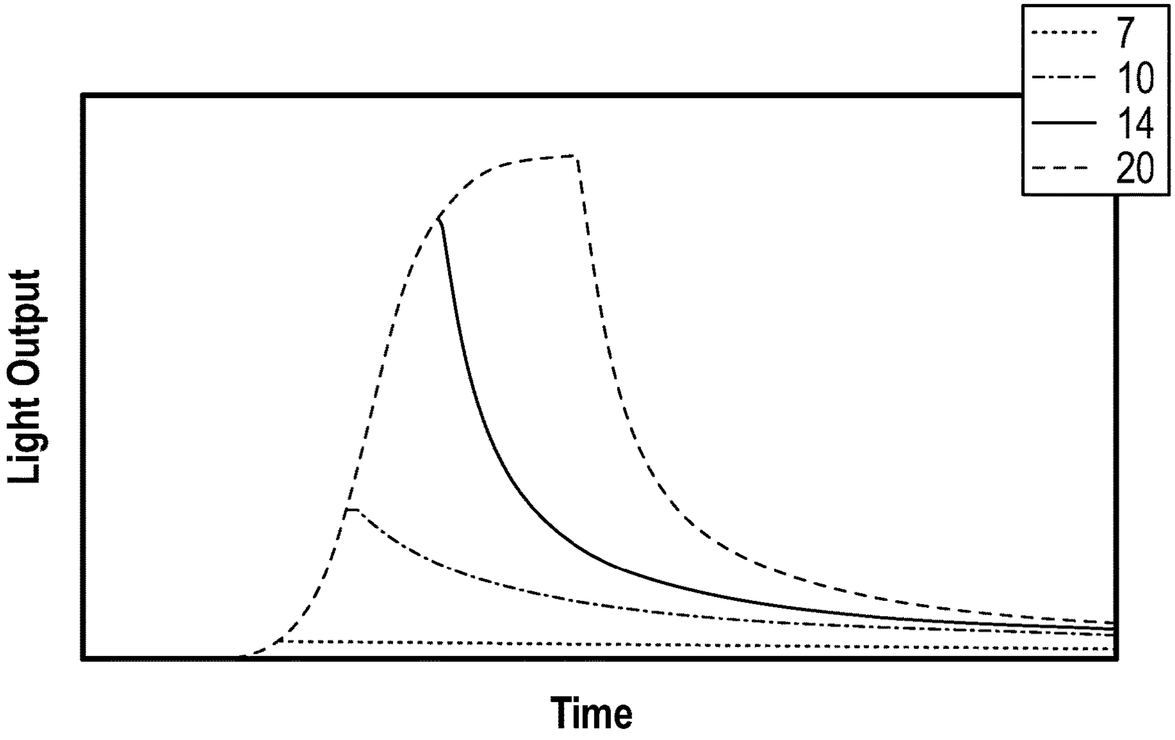
FIG. 2B is a plot representing light output of LEDs corresponding to the various low-level brightness values and associated pulse widths of FIG. 2A.

FIG. 2B is a plot representing light output of LEDs corresponding to the various low-level brightness values and associated pulse widths of FIG. 2A. The y-axis represents the light output and the x-axis represents relative time on a same scale as FIG. 2A. For each of the values 7, 10, 14, and 20, a same delay is realized before the LEDs turn-on and produce light output. Contributing factors to this delay mainly include an amount of resistance and capacitance in the driving circuit of the LED package and a forward voltage of the LED chip above which the LED chip begins emitting light. This forward voltage required to produce light depends on the bandgap of the active region of the LED chip and accordingly may also correspond to the color of light emitted. This no-light-output delay time is the time that it takes for the driver to charge the various capacitances of the driver output, control lines, etc., as well as the capacitance of the LED itself, thereby bringing the voltage from a lower level up to the forward voltage required to produce light. This delay time may be on the order of 1 microsecond (μs) or even much less, but PWM counter frequencies required to produce high dynamic range are much shorter. For example, PWM counter or clock frequencies on the order of 10 megahertz (MHz) or greater may be required.

When comparing the pulse widths of FIG. 2A with the light output responses of FIG. 2B, problems of little or no light output for low-level brightness values are apparent. As illustrated in FIG. 2B, the delay time may be considerable enough such that values of 7 or below produce very little or no LED light output before the end of the pulse width of FIG. 2A. Values between 8 and 14 produce successively increasing amounts of light before the end of their respective pulse widths, and values above 14 generally produce constant increments in the amount of light output since the LEDs are fully turned on for larger portions of the pulse widths. At the ends of the respective pulse widths of FIG. 2A, the corresponding light outputs of FIG. 2B decrease rapidly, but not instantly, due to discharge of capacitance as the LEDs turn off. At turn-off, voltages will drop near bandgaps of LED chips and certain capacitances may hold voltage levels above zero such that next PWM pulses may exhibit shorter delay than at initial start-up. Despite such shorter delay, the problems of little or no light output for low-level brightness values are noticeable considering the integration of many pulses and many associated delays during PWM control.

Figure 3A:
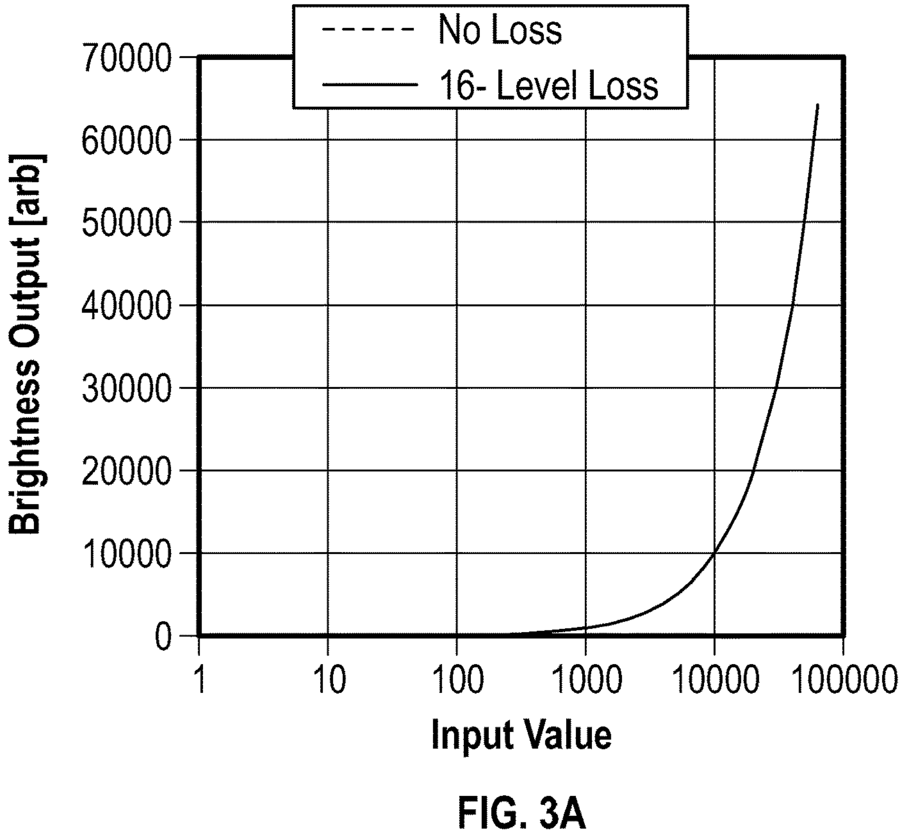
FIG. 3A is a plot illustrating a comparison with and without brightness output loss with a linear brightness scale for digital values of an exemplary 16-bit input grey scale.
Figure 3B:
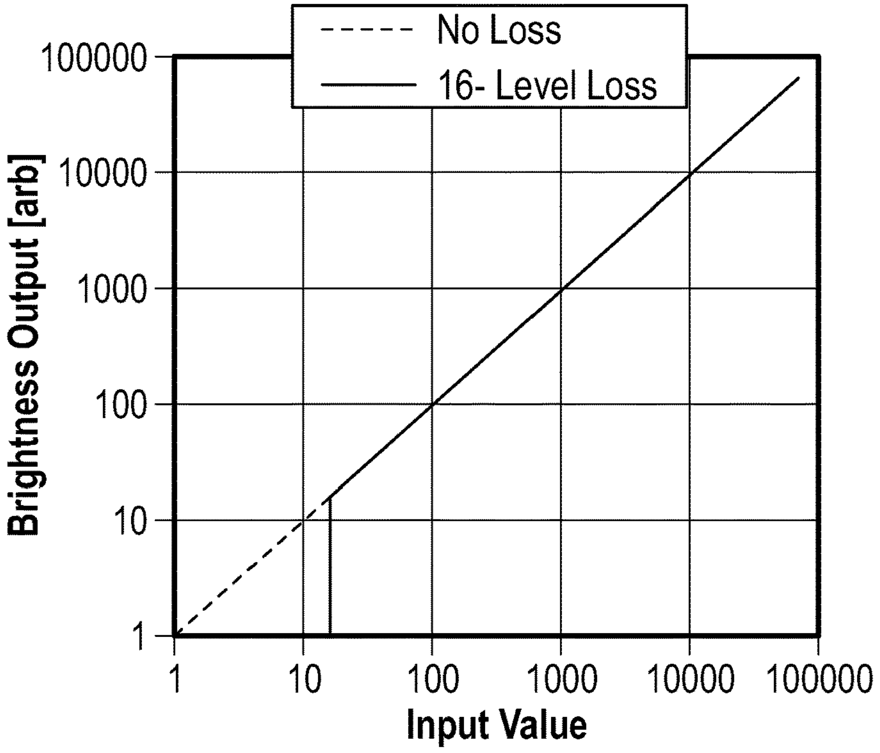
FIG. 3B is a plot of the same data as in FIG. 3A, just with a logarithmic brightness scale to better illustrate a human eye response.

FIGS. 3A and 3B are plots illustrating a comparison with and without brightness output loss for digital values of an exemplary 16-bit input grey scale used by an exemplary PWM driver. Such brightness output loss is described above in the context of FIGS. 2A and 2B where for illustrative purposes the first 16 values are abruptly lost with zero output. For both FIGS. 3A and 3B, the x-axis represents brightness input values and the y-axis represents brightness output in arbitrary units. In FIG. 3A, the y-axis is provided as a linear axis while in FIG. 3B, the same data is provided with a logarithmic y-axis. The 16-bit input, or 65,535 levels, yields a dynamic range of nearly five orders of magnitude. A solid line is provided for brightness output loss of the first 16 levels in comparison with a dashed line without brightness output loss. In FIG. 3A, the data lines without brightness output loss and with 16-level loss appear to overlap. In this regard, if the human eye response were linear, such brightness loss may not be noticeable. However, the human eye response is better approximated by logarithmic behavior. As such, FIG. 3B illustrates how LED delay times that cause brightness loss for just the first 16 levels adversely correlate to the loss of more than one order of magnitude of the overall dynamic range.

Figure 3C:
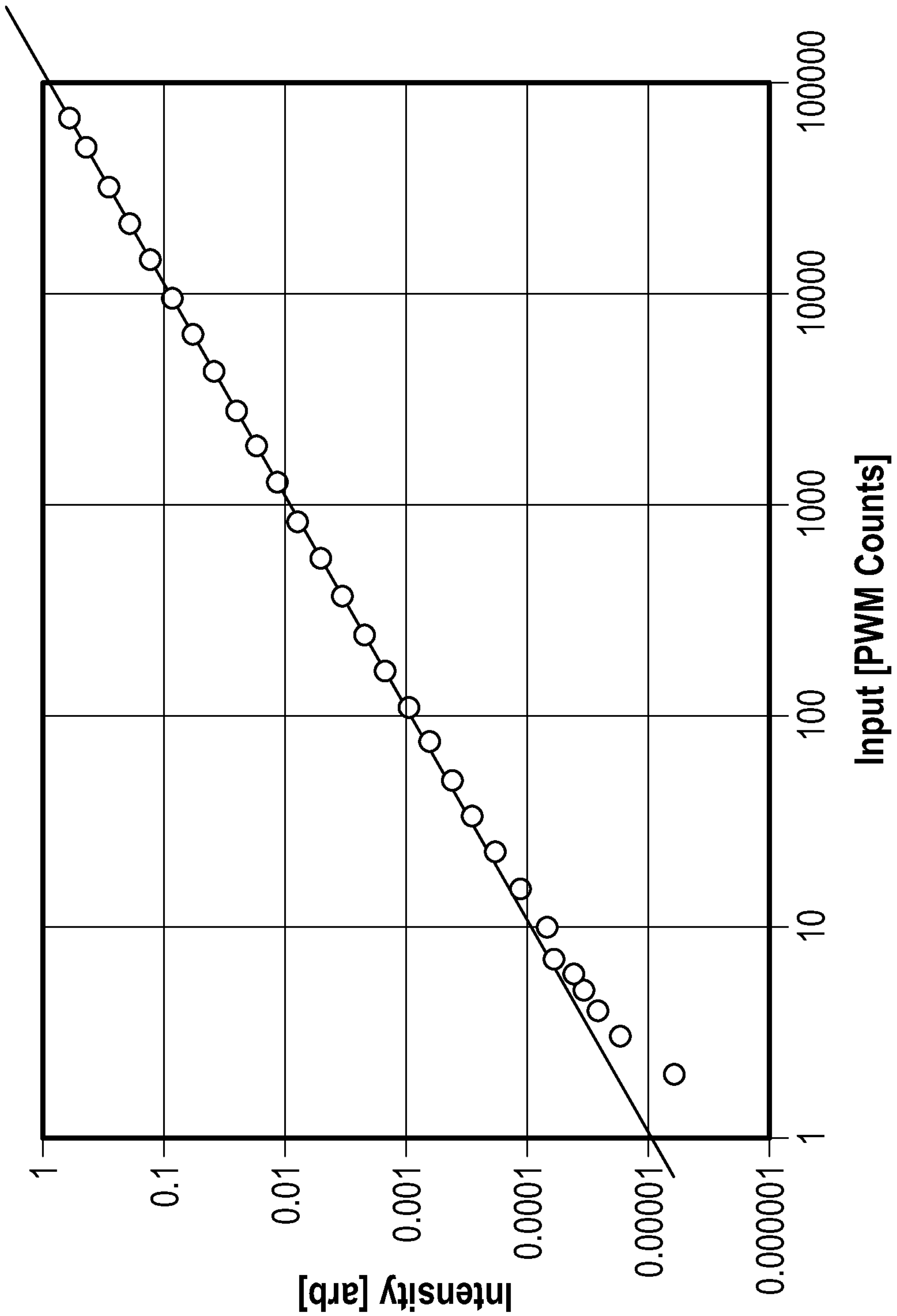
FIG. 3C is a plot of the brightness intensity versus the PWM counts to illustrate lower level brightness roll-off attributed to delayed LED turn-on times.

FIG. 3C is a plot of input PWM counts versus brightness intensity in arbitrary units to illustrate lower level brightness roll-off attributed to delayed LED turn-on times. In the example of FIG. 3C, roll-off from intended brightness begins below a PWM count of about 10 and the PWM value of “1” is completely lost. In this manner, the pulse width associated with the PWM value of “1” is smaller than the time delay for turning on the LED. In applications where the PWM frequency is increased to obtain more dynamic range and/or increased refresh rate, the intensity roll-off or dropout would be more severe and shifted to the right to encompass even more PWM counts.

According to aspects disclosed herein, the aforementioned problems associated with delayed LED turn-on may be compensated by shifting transformed input data so that each output PWM value corresponds with a pulse width that is at least greater than a delay time for the LED chip. In this manner, suitable brightness output may be provided across the dynamic range, including at the lower levels described above. LED packages arranged as LED pixels in a display may each include the capability to transform an input PWM signal for increased dynamic range and then shift the transformed values to avoid smaller pulse widths associated with brightness loss at lower levels.

Figure 4:
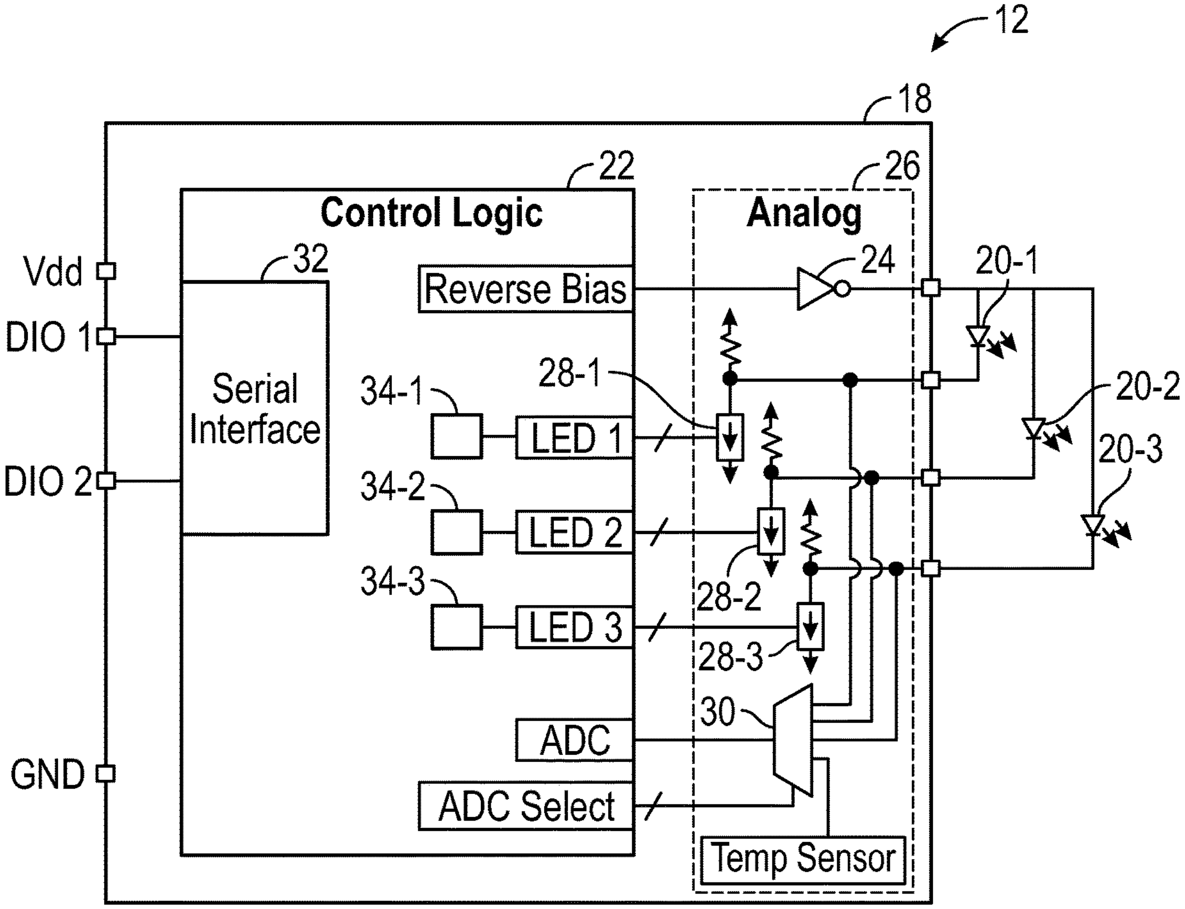
FIG. 4 is a block diagram of an LED package from FIG. 1 capable of transforming and shifting input PWM signals according to principles of the present disclosure.

FIG. 4 is a block diagram of an LED package 12 from FIG. 1 capable of transforming and shifting input PWM signals according to principles of the present disclosure. The active electrical element 18 may include multiple ports represented by a supply voltage (Vdd), ground (GND or Vss), and bidirectional communication ports or digital input/output ports (DIO1 and DIO2) according to embodiments disclosed herein. By having the DIO1 and DIO2 ports configured as bidirectional ports, the active electrical element 18 may advantageously be able to detect an input signal from a communication channel and then assign one of the DIO1 and DIO2 ports as an input port and the other of the DIO1 and DIO2 ports as the output port. Such functionality may be provided by input/output buffers and/or an active switching network internal to the active electrical element and electrically coupled to the DIO1 and DIO2 ports. This provides flexibility in layouts for displays where a plurality of LED packages 12 are connected together for cascade communication. For example, multiple LED packages 12 may be arranged in multiple rows where data cascades from package-to-package along each row and in a serpentine manner from row-to-row as illustrated in FIG. 1. In such arrangements, the bidirectional communication ports allow the LED packages 12 to be mounted in a same orientation and receive and transmit digital communication left-to-right or right-to-left depending on the row position. In addition to the four ports of Vdd, GND, DIO1, and DIO2 on the left side of the block diagram, the active electrical element 18 includes four ports on the right side that are coupled with LEDs 20-1 to 20-3 of the LED package 12. In this regard, the LEDs 20-1 to 20-3 are packaged together with the active electrical element 18 in the common LED package 12 to form an individual pixel of a larger display. As used herein, the LEDs 20-1 to 20-3 may also be referred to as LED chips.

Certain elements of the active electrical element 18 are described below; however, it is understood that the active electrical element 18 may include many other components, including memory elements, signal conditioning elements, thermal management, electrostatic discharge elements, clock elements, and oscillators, among others. In FIG. 4, control logic 22 is arranged to receive input data, execute commands according to a command protocol, provide control signals for operation of the LEDs 20-1 to 20-3, report various voltage levels and/or temperature levels included with output data, and transmit the output data via the DIO1 and DIO2 ports to the next adjacent LED package. The control logic 22 may operate in the digital domain and may include input/output buffers electrically coupled to the DIO1 and DIO2 ports that assign input and output configurations for the bidirectional DIO1 and DIO2 ports.

In certain embodiments, the active electrical element 18 may be configured to provide both forward and reverse bias states to the LEDs 20-1 to 20-3. In this regard, the control logic 22 may include a reverse bias control output signal that, with appropriate active elements, is configured to supply either near-Vdd or near-GND voltage levels to the LEDs 20-1 to 20-3. Since the nomenclature "reverse bias" implies that a high level on the control logic 22 output produces a reverse bias condition, the output signal could simply be coupled with an inverter 24 that is provided in a driver 26 of the active electrical element 18. As such, the LEDs 20-1 to 20-3 may be either forward biased or reverse biased depending on a particular operating state and/or command received by the control logic 22. The inverter 24, or inverter logic element, may have sufficient output characteristics to drive the LEDs 20-1 to 20-3. The driver 26 may be substantially an analog interface of the active electrical element 18 that is electrically coupled with the control logic 22. The driver 26 may include controllable current sources 28-1 to 28-3, which could also be configured as LED sink drivers. Pull-up resistors R1 to R3 may be incorporated to provide paths to Vdd for each of the LEDs 20-1 to 20-3, which aid with the voltage measurement when configured for reverse bias. Each of the current sources 28-1 to 28-3 may be electrically coupled with digital output signals LED1 to LED3 of the control logic 22. The output signals LED1 to LED3 may be provided along multiple wires that are coupled to each of the current sources 28-1 to 28-3 for current selection purposes. The output signals LED1 to LED3 may embody PWM outputs of the control logic 22 for controlling operation of the LEDs 20-1 to 20-3. The driver 26 may also include a multiplexer 30 electrically coupled with an analog-to-digital (ADC) converter and ADC selector of the control logic 22. Additionally, the driver 26 may include an on-chip temperature sensor that is provided through the multiplexer 30. In certain embodiments, the temperature sensor provides thermal compensation for the LEDs 20-1 to 20-3 via a thermal compensation curve and/or thermal shut down.

The active electrical element 18 further comprises a serial interface 32 that embodies a module with circuitry configured to decode and convert the incoming signal of the data stream into a bitstream in a local clock domain, which can be further processed by the control logic 22. In this manner, the serial interface 32 may also be referred to as a digital communication receiving device. The digital communication could be received from a controller (e.g., 16 of FIG. 1) And/or another LED package (e.g., 12 of FIG. 1) in a serial string. The serial interface 32 is further configured to retransmit the decoded and converted bitstream along with modified data to the communication channel to which another LED package or another external element is connected in a manner that is compatible with the overall LED display system.

In certain embodiments, the control logic 22 may include circuitry in the form of one or more PWM processors 34-1 to 34-3 that provide the output PWM signals LED1 to LED3. A separate PWM processor 34-1 to 34-3 may be provided for each LED chip 20-1 to 20-3 or the PWM processors 34-1 to 34-3 may be combined as single PWM processor for all of the LED chips 20-1 to 20-3. As will be described below in greater detail for FIG. 5, the one or more PWM processors 34-1 to 34-3 are configured to transform input PWM signals and then shift the transformed PWM values so pulse widths are provided to the LED chips 20-1 to 20-3 that compensate for delayed turn-on times.

Figure 5:
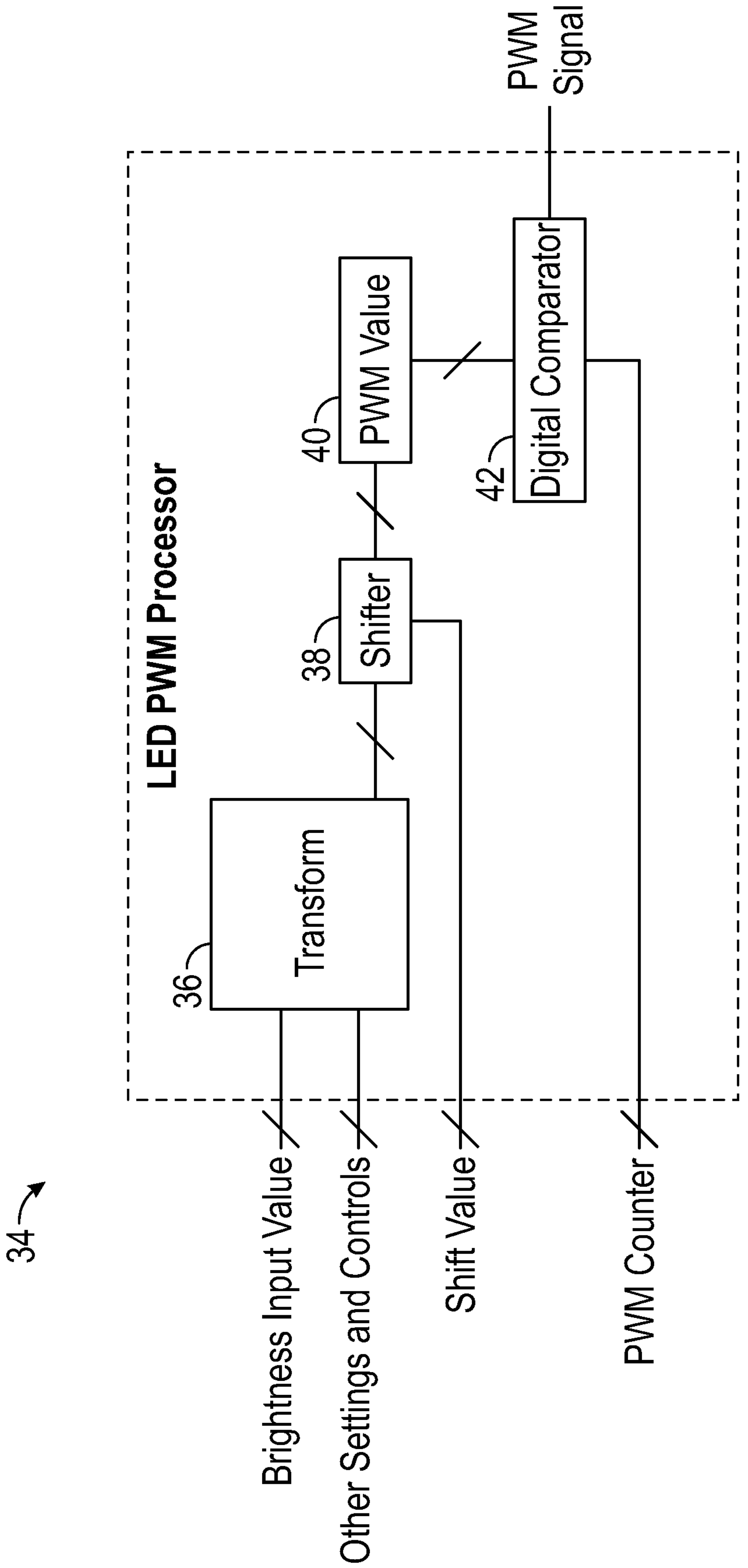
FIG. 5 is block diagram of a PWM processor that may represent any one or all of the PWM processors of FIG. 4.

FIG. 5 is block diagram of a PWM processor 34 that may represent any one or all of the PWM processors 34-1 to 34-3 of FIG. 4. Hash marks across various conductor lines indicate that multiple lines or signals may also be provided. The PWM processor 34 is configured to receive a brightness input value, such as input data, along with additional inputs labeled Other Settings and Controls, Shift Value, and PWM counter from other elements of the control logic 22 of FIG. 4. The PWM processor 34 outputs the PWM signal as a train of pulses for other elements, particularly the driver 26 of FIG. 4. The PWM counter input may embody a PWM counter value that is updated at a rate according to a clock frequency. In certain embodiments, the clock frequency is determined by a local oscillator of a clock of the active electrical element 18 of FIG. 4. The clock frequency may also be determined by a communication speed of the received digital signal. In still further embodiments, the clock frequency is determined by a clock that is external to the LED package 12 of FIG. 4, such as the controller 16 of FIG. 1.

In FIG. 5, a transform element 36 may perform calculations according to the inputs. Exemplary calculations include compression or decompression to provide increased dynamic range. Transformation results may include at least one of multiplication or exponential transformation of a received input brightness value. In one aspect, the calculations are gamma calculations. In certain embodiments, the transform element 36 may provide a transform output, or transformation result, according to the formula $$\text{transform output} = \text{CalFctr} * f(\text{brightness}) * g(\text{scaledTemp})$$

where CalFctr is the calibration factor, f is a transfer function providing capability such as data decompression (e.g., gamma) to the brightness input value, g is another transfer function providing temperature compensation capability in conjunction with the scaledTemp value received by a temperature sensor. The scaledTemp value may be determined from raw temperature sensor values according to the formula $$\text{scaledTemp} = \text{TempScale} * (\text{rawTemp} - \text{TempShift})$$

where rawTemp is the raw data value coming from the temperature sensor.

As illustrated in FIG. 5, the transform output of the transform element 36 is received by a shifter element 38. Based on the Shift Value input received, the shifter element 38 is configured to shift the transform output in a manner that compensates for LED turn-on delay. The Shift Value input may be a value that is hard set into the active electrical element 18 of FIG. 4, or the Shift Value may be user selectable. In certain embodiments, the Shift Value may be determined by an initial calibration that identifies a lowest PWM level that exhibits a pulse width that still provides useful light output. Alternatively, the Shift Value may be the result of previous calibrations for similar systems and/or based on known electrical characteristics of LED chips selected. Useful light output depends on application, but generally refers to a light output at a level that would be noticeable to a user. In another manner, a lowest PWM level that still provides useful light may be characterized where the corresponding pulse width is greater than a time delay to turn on the LED chip. Once the lowest useful PWM level is determined, the Shift Value may then be set at the lowest useful PWM level or even above it to ensure light output across the entire dynamic range. The Shift Value may then be user selectable through a communication system to the PWM processor 34, or hard set or coded based on system design. In certain embodiments, the shifter element 38 may comprise a logic set of gates, such as AND gates, OR gates, or other logic. The shifter element 38 may embody a processor element executing a program that resides within the PWM processor 34. In certain aspects, logic associated with the shifter element 38 may be shared with other elements of the active electrical element 18. In certain aspects, the shifter element 38 may also be referred to as an adder.

As illustrated in FIG. 5, the PWM processor 34 is configured to apply the shift after the input data (e.g., Brightness Input Value) are transformed by the transform element 36. The transformed and shifted signal is then provided as a PWM value 40 that is a result of at least two processing elements (i.e., the transform element 36 and the shifter element 38). The output PWM signal of the PWM processor 34 is then generated as the result of a digital comparator 42 which outputs an "LED on" signal when the PWM counter input is less than the PWM value 40 and "LED off" otherwise. Accordingly, the PWM value 40 may be referred to as a post-shifted value before the output PWM signal is provided to the driver 26 of FIG. 4.

Without the shift provided by the shifter element 38, the transform output from the transform element 36 would be provided to the digital comparator 42 for comparison with the PWM counter. Since the transform output is intended to increase resolution at lower PWM levels, such an arrangement would output various PWM levels below LED turn-on thresholds. Alternatively, if a shift was implemented before transformation in the transform element 36, such as a shift already being present in the input brightness value received by the controller 16 of FIG. 1, multiplication factors during transformation may still result in PWM levels with pulse widths below LED turn-on times. In order to provide functionality of calibration, thermal compensation, and/or data decompression while also compensating for LED turn-on times, the shift should be applied following the transformation. This ensures that all transformed values have a pulse width that exceeds the LED turn-on time. In this manner, the PWM value 40 of FIG. 5 may be determined according to the formula.

$$\text{PWM Value}=\text{transform output}+\text{Shift Value}$$

which may also be represented according to the below formula in view of the calculation for the transform output provided above.

$$\text{PWM Value}=\text{CalFctr}*f(\text{brightness})*g(\text{scaledTemp})+\text{Shift Value}$$

Accordingly, the PWM value 40 of FIG. 5 may be the result of a first transformation which may include a series of multiplications followed by addition of the Shift Value.

By way of example, for 16-bit signals with levels from 0-65,535, it may be determined that a Shift Value of 10 is needed to compensate for LED turn-on delay. Accordingly, transform output values from the transform element 36 will be shifted 10 levels by the shifter element 38 such that a post-transformation value of "1" is shifted to a value of "11" to ensure useful light output. In certain embodiments, logic within the PWM processor 34 may be implemented so that the post-Shift Value does not exceed a maximum PWM value of a PWM period dictated by the PWM counter. In the 16-bit example above, such logic would shift values from 1 to 65,525 by 10 levels, and reduced shifts would be applied such that all values from 65,525 and up would saturate and equal the maximum of 65,535 levels and not roll over to low values. This may be necessary because low-level logic designs may not accommodate larger values and a high value would roll over to a low value instead. With reference to the logarithmic eye response described in FIG. 3B, differences between levels 65,525 and 65,535 are much less detectable than differences at lower levels between 1 and 10, since a level of 10 appears ten times brighter than a level of 1. In still further embodiments, the logic within the PWM processor 34 may also be implemented to suppress shifting for transform output values of "0" to ensure there is no light output as intended for values of zero. With implementation of such logic, the PWM value 40 of FIG. 5 may be determined according to the formula $$PWM\ \text{Value} = \text{transform output} + \begin{cases} 0 & \text{if transforms output} = 0 \\ PWM_{Max} & \text{if transform output} + \text{Shift Value} > PWM_{Max} \\ \text{Shift Value} & \text{otherwise} \end{cases}$$

such that values of "0" remain "0" and PWM values 40 do not exceed maximum PWM values as dictated by the PWM counter. In this regard, shifter element 38 may be configured as an adder set to operate only if transform output>0 and produces $PWM_{Max}$ when a final carry signal is detected.

The description provided above may convey various aspects of the present disclosure according to various embodiments. Many other adaptations are contemplated. For example, individual PWM processors 34 may be provided for each LED chip within a package, or the function of individual PWM processors 34 may be provided with a single PWM processor 34 providing the various calculations at various times. The transform element 36 and the shifter element 38 may form separate processing elements within the PWM processor 34 or they may be integrated as a single processing element. Such single or multiple processing elements within the PWM processor 34 may be implemented according to the direction of a finite state machine (FSM). A further example would be the single or multiple processing elements forming at least a portion of an arithmetic logic unit (ALU) that provides all the mathematical functions as controlled by an FSM. In view of the above, the block diagram of FIG. 5 may provide one implementation and/or arrangement of physical hardware and connections. Alternatively, the block diagram of FIG. 5 may conceptually provide how physical hardware routes signals over time, but not necessarily how the physical hardware is specifically arranged and physically connected together in various embodiments.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A method of light output control within a light-emitting diode (LED) package, the method comprising:

transforming a received input brightness value to provide a transformation result;

applying a shift value to the transformation result to provide a pulse width modulation (PWM) value;

producing a PWM signal with a pulse width according to the PWM value; and electrically activating an LED chip within the LED package with the PWM signal, wherein the shift value is configured such that the pulse width of the PWM signal is greater than a turn-on time for the LED chip for all possible PWM values.

2. The method of claim 1, wherein transforming the received input brightness value comprises thermal compensation.

3. The method of claim 1, wherein transforming the received input brightness value comprises data decompression.

4. The method of claim 3, wherein the data decompression models a gamma function.

5. The method of claim 1, wherein transforming the received input brightness value comprises multiplication by a calibration factor.

6. The method of claim 1, wherein producing the PWM signal with the pulse width according to the PWM value comprise a comparison with a PWM counter value, wherein the PWM counter value is updated at a rate according to a clock frequency.

7. The method of claim 6, wherein the clock frequency is determined by a local clock of the LED package.

8. The method of claim 6, wherein the clock frequency is determined by a communication speed of a digital signal received by the LED package.

9. The method of claim 6, wherein the clock frequency is determined by an external clock.

10. The method of claim 1, wherein applying the shift value to the transformation result comprises only applying the shift value when the transformation result is above zero.

11. The method of claim 10, wherein the shift value is applied in a manner so that the PWM value saturates and does not exceed a maximum value of a PWM period and does not roll over to low values.

12. A light-emitting diode (LED) package configured for receiving and transmitting digital communication signals, the LED package comprising:

at least one LED chip;

an LED driver configured to at least partially drive the at least one LED chip by pulse width modulation (PWM); and a PWM processor configured to provide a transformation result based on at least one of multiplication or exponential transformation of a received input brightness value, the PWM processor further configured to provide a PWM value based on a shift of the transformation result, wherein the PWM processor is configured to provide a PWM signal to the LED driver with a pulse width according to the PWM value, and the pulse width of the PWM signal is greater than a turn-on time for the at least one LED chip for all levels of a PWM period of the PWM signal.

13. The LED package of claim 12, wherein the PWM processor is configured to produce the PWM signal to the LED driver based on the PWM value.

14. The LED package of claim 13, wherein a portion of the PWM signal leaving the PWM processor is zero when the transformation result is zero.

15. The LED package of claim 13, wherein the PWM processor is configured to provide the PWM value as a final operation before conveyance of the PWM signal to the LED driver.

16. The LED package of claim 12, wherein the PWM processor comprises a transformation element configured to provide the transformation result and a shifter element configured to provide the PWM value.

17. The LED package of claim 12, wherein the PWM processor comprises a processing element this is configured to provide both the transformation result and the PWM value.

18. The LED package of claim 17, wherein the processing element is configured to perform multiple calculations at different times.

19. The LED package of claim 18, wherein the processing element is configured to perform the multiple calculations under the control of a finite state machine.

20. The LED package of claim 18, wherein the processing element forms at least a portion of an arithmetic logic unit (ALU).

21. The LED package of claim 12, wherein the PWM processor is configured such that the PWM value does not exceed a maximum value of the PWM period and the PWM value does not roll over to a lower value.

* * * * *